(12) United States Patent
De' Longhi

(10) Patent No.: US 8,907,252 B2
(45) Date of Patent: Dec. 9, 2014

(54) ELECTRIC OVEN AND PROCEDURE FOR COOKING A FOOD PRODUCT IN A VERY LOW LEVEL OF FAT SUBSTANCE

(75) Inventor: Giuseppe De' Longhi, Treviso (IT)

(73) Assignee: De'Longhi Appliances S.R.L., Treviso (IT)

(*) Notice: Subject to any disclaimer, the term of this patent is extended or adjusted under 35 U.S.C. 154(b) by 390 days.

(21) Appl. No.: 12/784,326

(22) Filed: May 20, 2010

(65) Prior Publication Data

US 2010/0303985 A1   Dec. 2, 2010

(30) Foreign Application Priority Data

May 27, 2009   (EP) ..................................... 09425209

(51) Int. Cl.
*A47J 37/00* (2006.01)
*A47J 37/12* (2006.01)
*A47J 43/046* (2006.01)
*A23L 1/01* (2006.01)
*A47J 37/10* (2006.01)

(52) U.S. Cl.
CPC ................ *A47J 43/046* (2013.01); *A47J 37/10* (2013.01)
USPC ........... 219/400; 219/392; 219/393; 219/395; 219/399; 99/409; 126/21 A

(58) Field of Classification Search
None
See application file for complete search history.

(56) References Cited

U.S. PATENT DOCUMENTS 3,828,760 A * 8/1974 Farber et al. ................. 126/21 A
4,901,633 A * 2/1990 De Longhi ...................... 99/409
5,182,981 A * 2/1993 Wilcox ............................ 99/333
5,590,583 A * 1/1997 Harrison .......................... 99/327
5,778,766 A * 7/1998 Wang ............................... 99/326
6,603,102 B2 * 8/2003 Brown et al. .................. 219/681
6,629,491 B1 * 10/2003 Chan ............................... 99/331
7,411,159 B2 * 8/2008 Oosterling .................... 219/400
7,901,721 B2 * 3/2011 Oosterling .................... 426/466

(Continued)

FOREIGN PATENT DOCUMENTS

CN    201150473    11/2008
EP    1962021 A2   8/2008

(Continued)

OTHER PUBLICATIONS

JP 1-296014, Nov. 28, 1989, Iwabuchi et al, abstract.*
European Search Report, Application No. 09425209.5 dated Aug. 18, 2009.

*Primary Examiner* — Joseph M Pelham
(74) *Attorney, Agent, or Firm* — Ohlandt, Greeley, Ruggiero & Perle, L.L.P.

(57) ABSTRACT

An electric oven for cooking a food product in a fat substance comprises a cooking chamber, at least one electrical heating resistance housed in the cooking chamber, a vessel mountable inside the cooking chamber and housing, at least one rotatable stirring blade that is able to rotate the food product to cover the food product with a film of fat substance, and a drive pin to drive said stirring blade in rotation. The stirring blade is configured so as to displace the food product such that at last a portion of the food product comes into contact with the fat substance for combined cooking by action of air on the portion of the food product located above the fat substance and by action of fat substance immersion at least on a portion of the food product immersed in said fat substance.

8 Claims, 7 Drawing Sheets

(56) References Cited

U.S. PATENT DOCUMENTS

| | | | |
|---|---|---|---|
| 8,618,447 B2 * | 12/2013 | De' Longhi | 219/430 |
| 2002/0040902 A1 * | 4/2002 | Brown et al. | 219/681 |
| 2002/0066724 A1 * | 6/2002 | Brown et al. | 219/400 |
| 2004/0035845 A1 * | 2/2004 | Moon et al. | 219/400 |
| 2005/0077283 A1 | 4/2005 | Shawhney | |
| 2008/0264927 A1 | 10/2008 | Peng | |
| 2010/0301034 A1 * | 12/2010 | Greenwood et al. | 219/400 |

FOREIGN PATENT DOCUMENTS

| | | | |
|---|---|---|---|
| JP | 01296014 A | * | 11/1989 |
| JP | 02029511 | | 1/1990 |
| JP | 04369322 | | 12/1992 |

* cited by examiner

ELECTRIC OVEN AND PROCEDURE FOR COOKING A FOOD PRODUCT IN A VERY LOW LEVEL OF FAT SUBSTANCE

CROSS-REFERENCE TO RELATED APPLICATION

This application claims priority from European Patent Office Application No. 09425209.5, filed on May 27, 2009.

FIELD

The present invention refers to an electric oven and a procedure for cooking a food product in a very low level of fat substance.

BACKGROUND

In conventional fan-assisted electric ovens, the food product placed therein is cooked by contact with forced circulation of air from the fan. Should it also be wished that the food be cooked by frying, the user must either apply a large volume of fat substance to the cooking surface at the beginning of the cooking process or repeatedly extract the vessel containing the food product, apply fat substance, and displace the food product in order to coat the cooking surface of the vessel and/or coat the food product. Should it further be wished that the food be cooked by deep-fat frying, a significant amount of fat substance is required such that the food product is completely immersed in the fat substance or the user must repeatedly extract the vessel containing the food product and mix the food product to ensure that it is evenly immersed in the fat substance.

Use of a large volume of fat substance is unhealthy, expensive and results in a product having low organoleptic properties. Fat substance used in deep-fat frying is often re-used in order to lower expense, thereby further lowering the organoleptic properties of the cooked food product. It is therefore desirable to use a lower amount of fat substance in cooking. However, repeated extraction of the vessel and application of additional fat substance and/or mixing of the food product is time consuming and poses a safety hazard due to the high thermal heat capacity of fat substance.

SUMMARY

The technical task proposed by the present invention is, therefore, that of providing an electric oven and a procedure for cooking a food product in a very low level of fat substance that overcomes the noted drawbacks of the prior art.

Within the scope of this technical task, one object of the invention is that of providing an electric oven and a procedure capable of cooking a food product, using a very low level of fat substance, by exposure to air, frying and fat substance immersion without the need for extraction of the food product during the cooking process.

Another object of the invention is that of providing a safe and cost-effective electric oven and a procedure for cooking a food product in a very low level of fat substance.

The technical task as well as these and other objects, are achieved according to the present invention by an electric oven for cooking a food product in a very low level of fat substance characterised in that said oven comprises a cooking chamber, at least one electrical heating resistance housed in said cooking chamber, a vessel mountable inside said cooking chamber and housing at least one rotatable stirring blade that is able to rotate said food product to cover the latter with a film of fat substance, and a drive pin to drive said stirring blade in rotation, said stirring blade being configured so as to displace said food product such that at least a portion of the surface of the latter comes into contact with said fat substance for combined cooking by action of air on the portion of said food above said level of fat substance and by action of fat substance immersion at least on a portion of said food below said level of fat substance.

The present invention also refers to a procedure for cooking a food product in a very low level of fat substance with an electric oven characterised in that said oven is of the type comprising a cooking chamber and at least one electrical heating resistance housed in said cooking chamber, and in that said procedure further comprises a step of introducing into said cooking chamber a vessel equipped therein with a rotatable stirring blade that is able to rotate said food product to cover the latter with a film of fat substance, a step of connecting said stirring blade to a drive pin, a step of activating said drive pin to drive said stirring blade in rotation so as to displace said food product such that at least a portion of the surface of the latter comes into contact with said fat substance for combined cooking by action of air on the portion of said food above said level of fat substance and by action of fat substance immersion at least on a portion of said food below said level of fat substance.

The stirring blade arrangement of the invention enables the food product to be rotated and displaced inside the oven during cooking, obviating the need for extraction of the vessel during the cooking process and the associated time and safety drawbacks.

Moreover, the stirring action ensures that the food product is adequately mixed, such that only a small amount of fat substance is needed for cooking by fat substance immersion, thereby providing a healthier cooked product, reducing the fat substance volume requirement and its associated cost, and increasing the organoleptic properties of the cooked product.

The stirring action also ensures that a fat substance film is spread on the bottom of the vessel and, by rotation of the food product, covering the food product with a fat substance film, thereby providing the possibility of cooking by exposure to air, frying and fat substance immersion using a very low level of fat substance, without the need for extraction of the vessel, manual mixing, or addition of fat substance. Moreover, the rotation of the food product ensures that the food is uniformly cooked by the end of the cooking process.

The invention provides a simple and cost-effective electric oven design. Moreover, the invention is easy to clean as only the vessel and the stirring blade, both of which are extractable from the cooking chamber, come into contact with the fat substance and the food product.

Other characteristics of the present invention are moreover defined in the subsequent claims. Further characteristics and advantages of the present invention will be more evident from the description of a preferred, but not exclusive, embodiment of the electric oven for cooking a food product in a very low level of fat substance able to only partially cover said food product according to the finding, illustrated in the attached non-limiting drawings.

Figure 1:
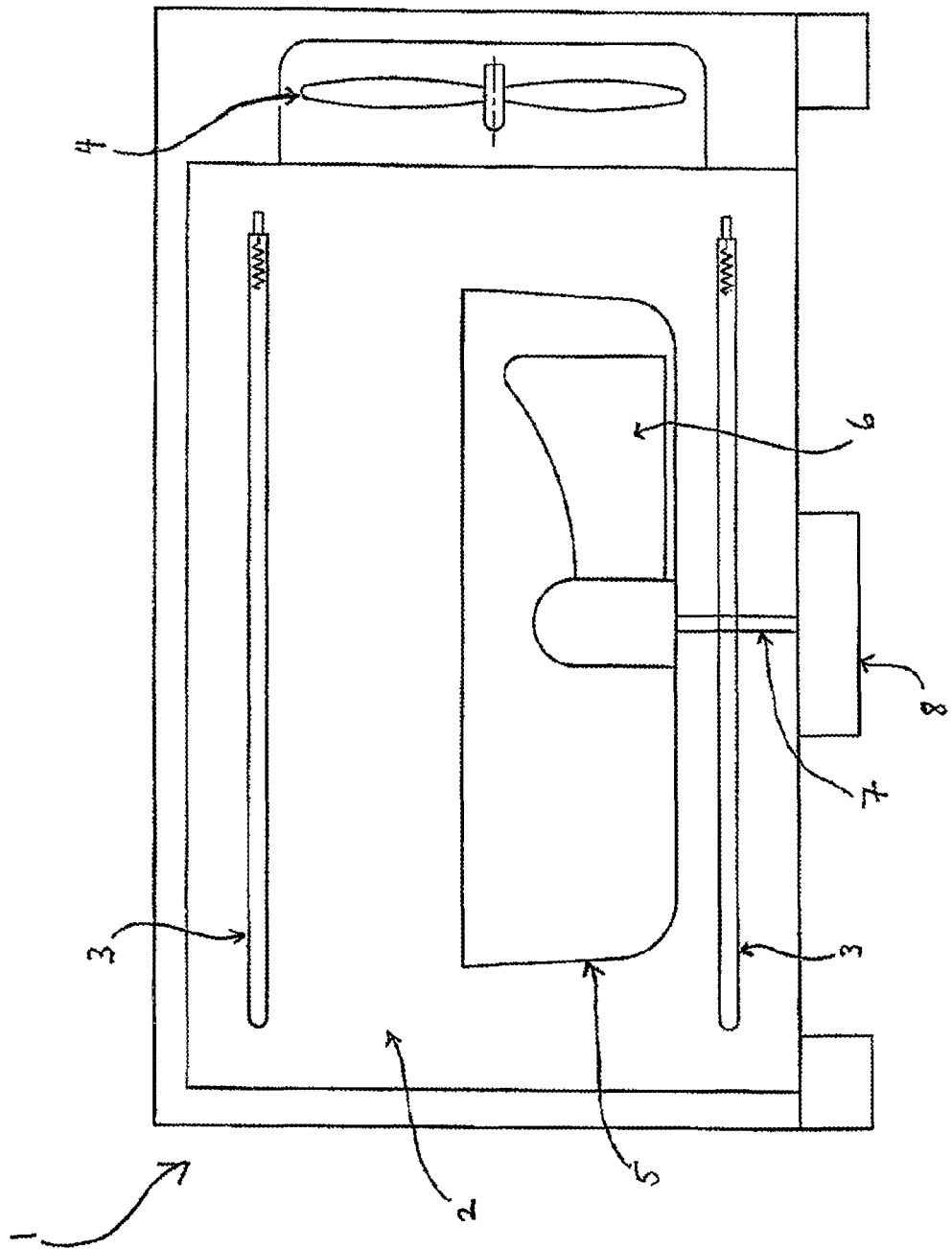
FIG. 1 shows a cross-sectional front view of the oven with a lateral fan in accordance with one embodiment of the invention.

The reference numbers refer to equivalent features in each of the figures.

DETAILED DESCRIPTION

With reference to the above figures, an electric oven for cooking a food product in a very low level of fat substance, wholly indicated by reference number 1, is shown.

The oven 1 comprises a cooking chamber 2 and at least one electrical heating resistance 3. Preferably, a fan 4 can be housed outside the cooking chamber 2 but arranged at any position relative to the cooking chamber, such that it provides forced circulation of air through said cooking chamber. FIGS. 1 and 2, 3 and 4, 5 and 6 show the fan 4 arranged at a side wall of the cooking chamber, at a top wall of the cooking chamber, and at a rear wall of the cooking chamber, respectively, but it will be appreciated that any arrangement, including at a bottom wall of the cooking chamber, is foreseeable, as well as the use of multiple fans.

The oven 1 further comprises a vessel 5, preferably of thermally conductive material suitable for frying a food product contained therein. The vessel 5 preferentially has a bore (not shown) with a rim adapted to cooperate with the central bushing of a rotatable stirring blade 6, housed in said vessel. The connection between the blade 6 and the vessel 5 is preferably such that fat substance and/or food product cannot leak out of the vessel through the bore. The vessel 5 and the stirring blade 6 are extractable from the cooking chamber such that the food product can be loaded and unloaded in a convenient manner, and the units can be washed.

The oven 1 comprises a drive pin 7 extending from a motor 8. Optionally, the motor is housed in the vessel 5 or located outside the cooking chamber, with the drive pin protruding though the bottom of the cooking chamber 2. Advantageously, the vessel 5 and stirring blade 6 can be mounted in the cooking chamber 2 by introduction of the drive pin 7 through the bore of the vessel and into the central bushing of the stirring blade, with which it can be releasably engaged.

The preferential arrangement of the driving pin 7 protruding through the bottom of the vessel 5 enables the vessel 5 to have an open top, allowing the user to see the food product during cooking and assess its cooked state without having to extract the vessel 5 from the cooking chamber 2.

In operation, the cooking operation of the oven 1 is as follows. The food product and the desired amount of fat substance is loaded in the vessel 5 containing the stirring blade 6. The level of fat substance is preferably such that the food product is not completely immersed therein, further preferably such that the level is very low. The vessel and the stirring blade are together then mounted on the drive pin 7 in the cooking chamber 2 such that the stirring blade is connected to the drive pin. In the embodiment where the drive pin does not protrude through the bottom wall of the cooking chamber 2, the vessel and the stirring blade may optionally be mounted on the drive pin outside the cooking chamber, this whole combined unit then being mounted in the cooking chamber 2. The motor 8 brings the drive pin 7 in rotation, in turn rotating the stirring blade 6 inside the vessel 5 around the axis of the drive pin. The vessel 5 remains stationary.

The rotation action of the stirring blade 6 advantageously spreads a film of fat substance over the cooking surface of the vessel 5, enabling the food product to be fried by contact with this surface. The at least one electrical heating resistance 3 provides the necessary energy to heat the cooking surface.

The stirring blade 6 also displaces the food product such that at least a portion of the latter comes into contact with the fat substance. This enables the food to be cooked by fat substance immersion, the fat substance being heated by energy from the at least one electrical heating resistance 3.

Additionally, the portion of the food product above the level of the fat substance is cooked by exposure to the air in the cooking chamber, heated by the at least one electrical heating resistance 3, and preferably forced to circulate in the cooking chamber 2 by the fan 4.

The rotation of the stirring blade 6 also ensures that all three of the cooking actions can take place during the cooking process and that the food product is rotated during the cooking process, coating the food with a film of fat substance, such that it is uniformly cooked on all sides.

The stirring blade 6 may be of any shape suitable for rotating the food product and achieving effective displacement of the food product, and may be selected based on the consistency of the food product to be cooked. For example, a fragile food product may require a blade 6 having an gently inclined surface relative to the bottom surface of the vessel 5, whereas a less fragile food may require a simple blade extending along the axis of the drive pin 7, perpendicular to the bottom surface of the vessel 5.

The oven 1 may preferentially comprise two electrical resistances 3 inside the cooking chamber 2, as shown in FIGS. 1-6, preferably arranged such that the vessel 5 can be mounted in between the two, and preferably at the top wall and the bottom wall of the cooking chamber.

Figure 2:
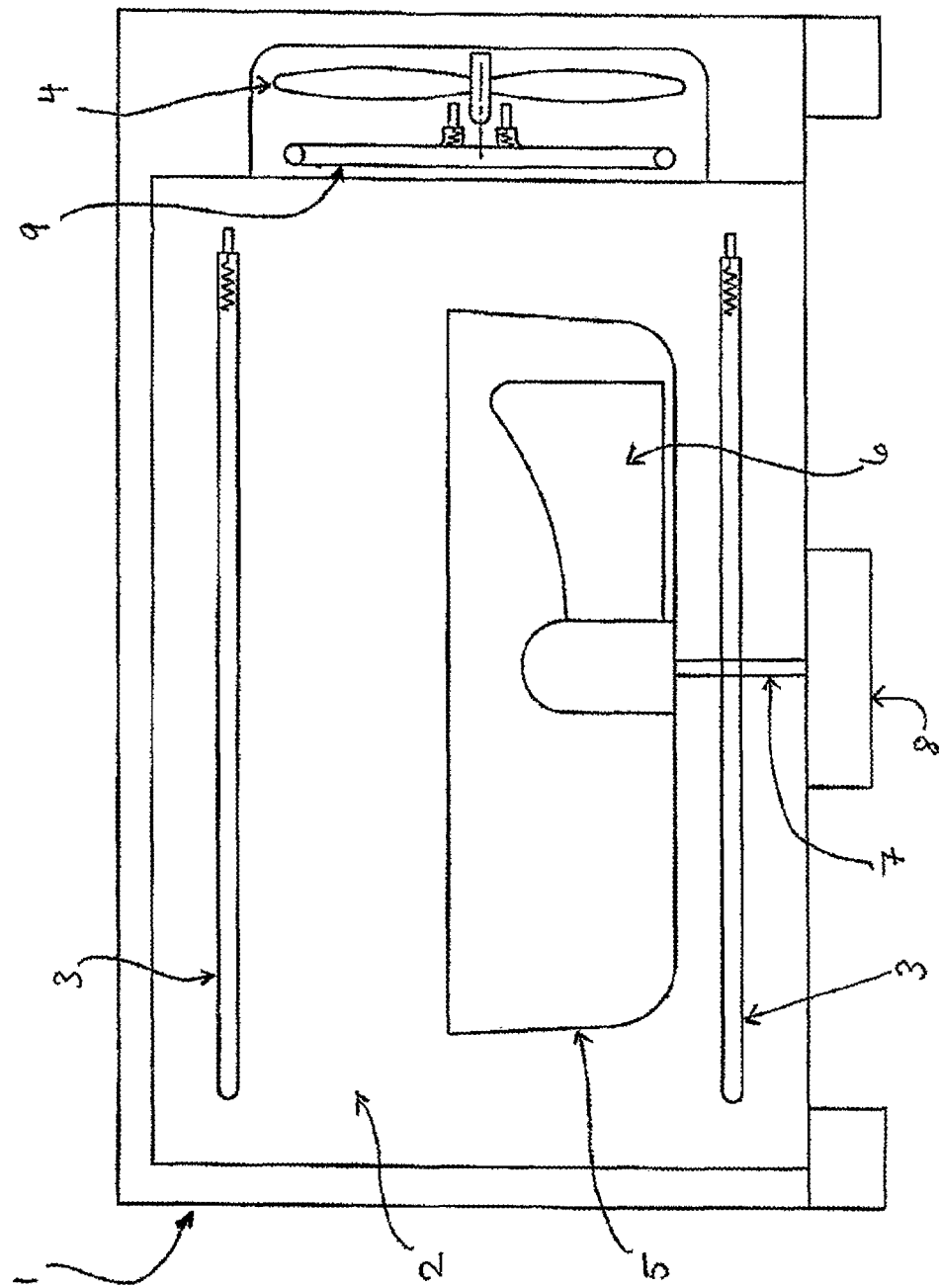
FIG. 2 shows an alternative embodiment of the view of FIG. 1.
Figure 3:
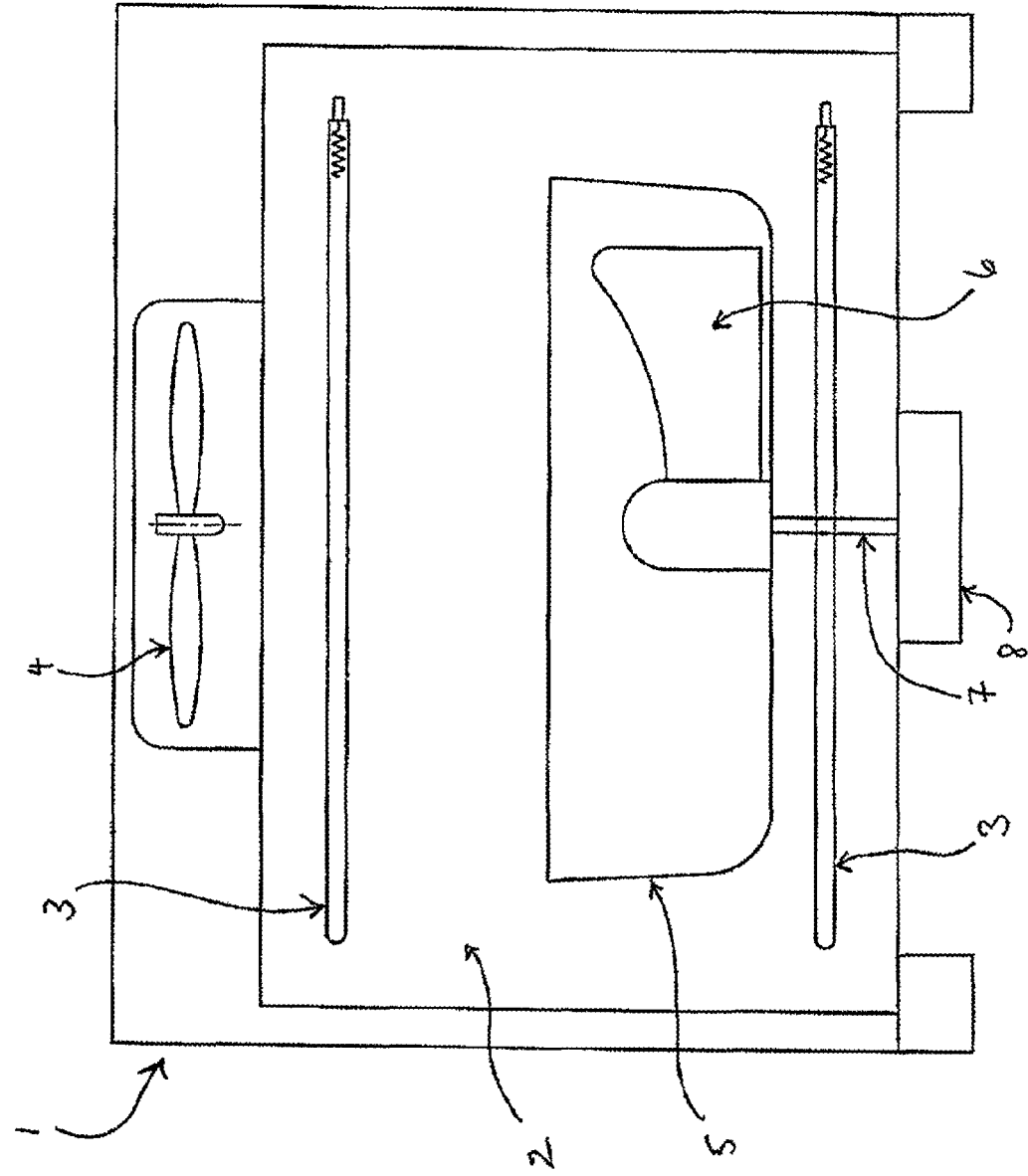
FIG. 3 shows a cross-sectional front view of the oven with an upper fan in accordance with another embodiment of the invention.
Figure 4:
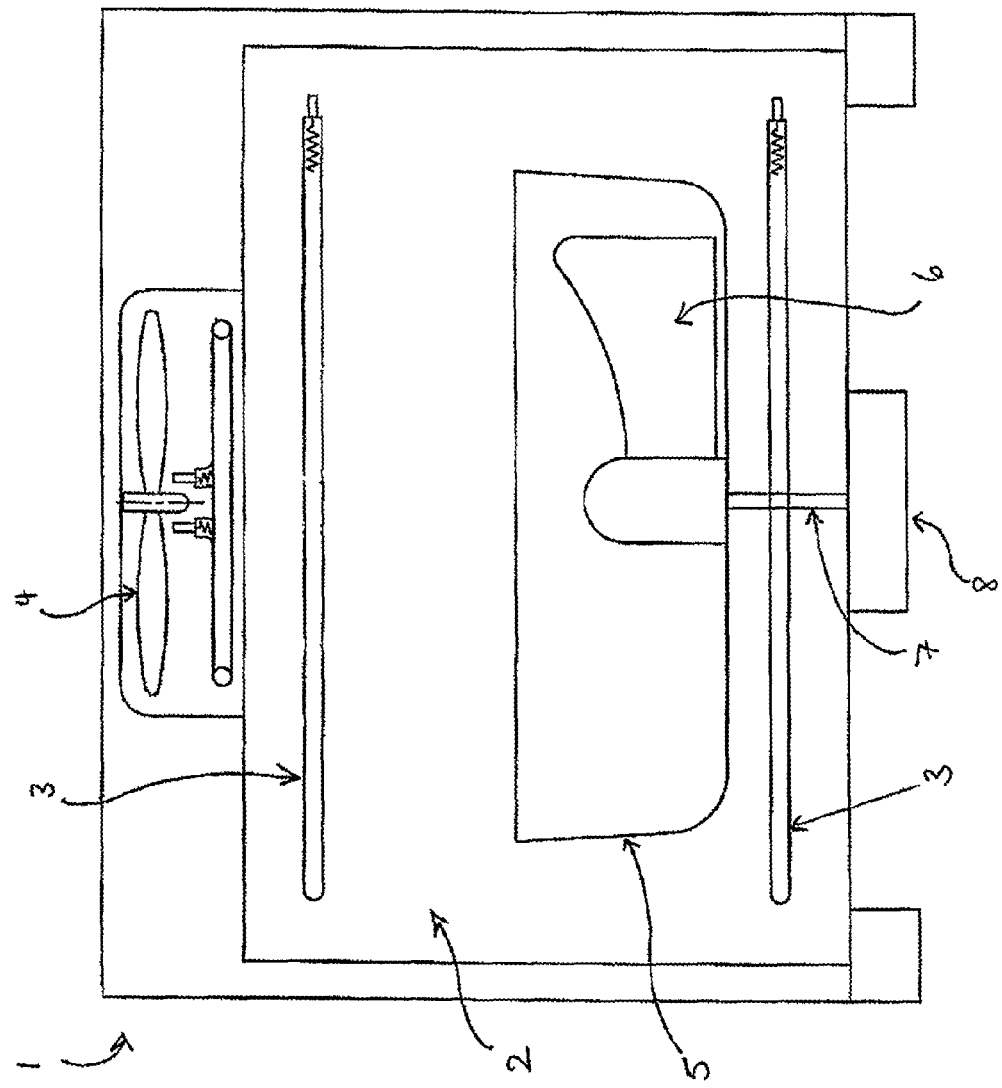
FIG. 4 shows an alternative embodiment of the view of FIG. 3.
Figure 5:
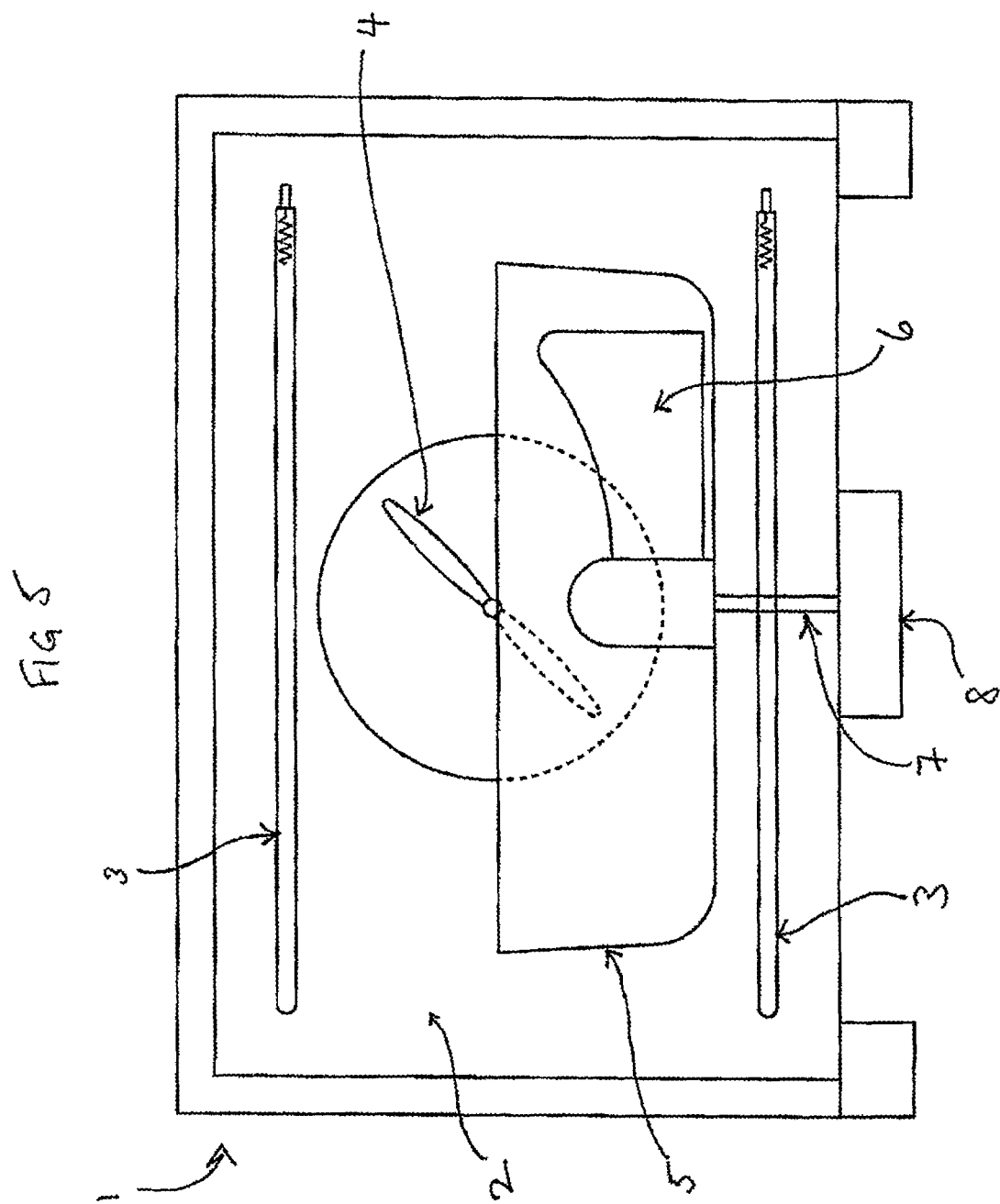
FIG. 5 shows a cross-sectional front view of the oven with a posterior fan in accordance with another embodiment of the invention.
Figure 6:
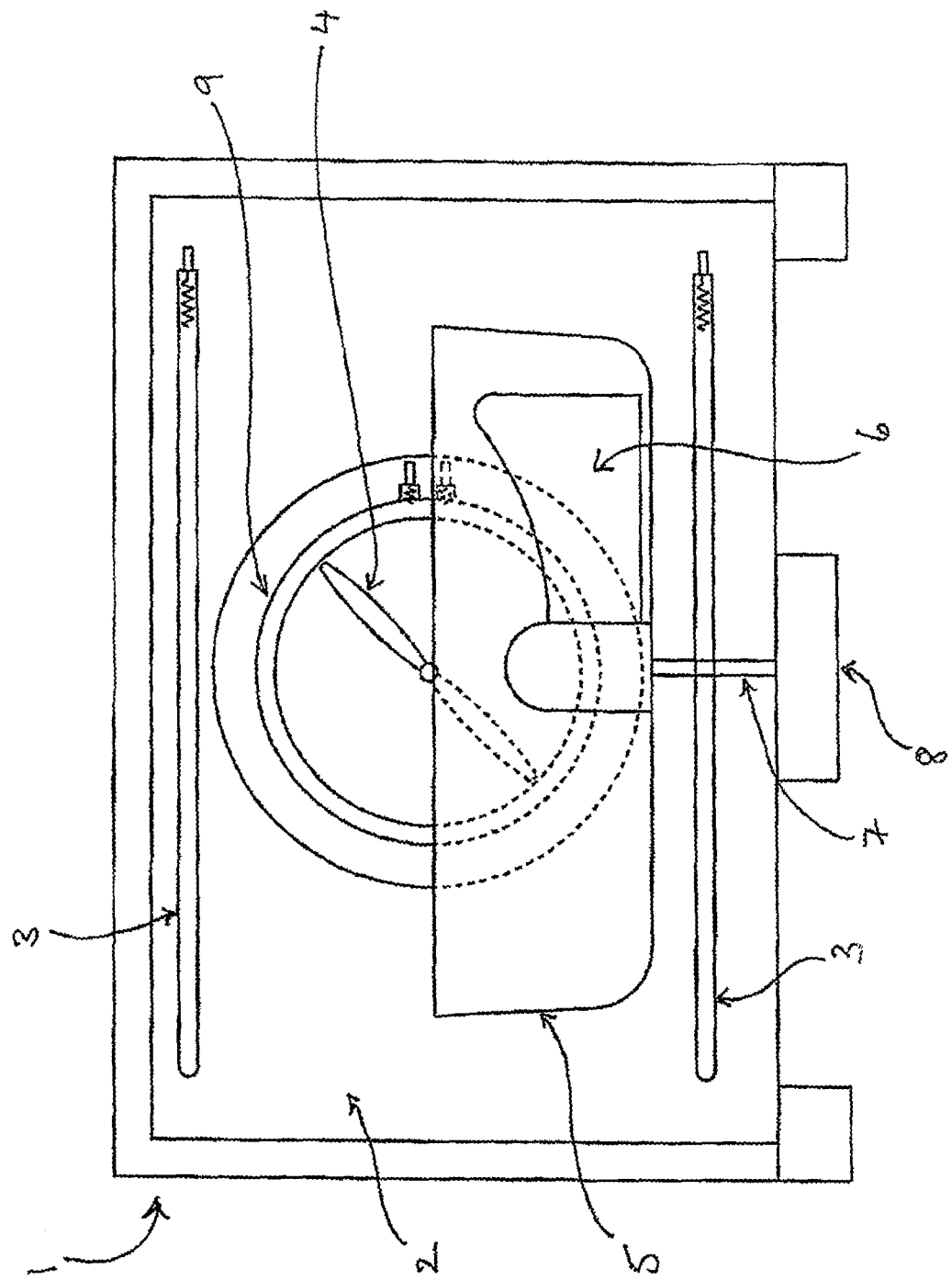
FIG. 6 shows an alternative embodiment of the view of FIG. 5.

In a preferred embodiment of the invention, as shown in FIGS. 2, 4 and 6, the oven 1 comprises an additional electrical heating element 9, located in front of the fan 4 for improved heating of the air flowing into the cooking chamber 2.

Figure 7:
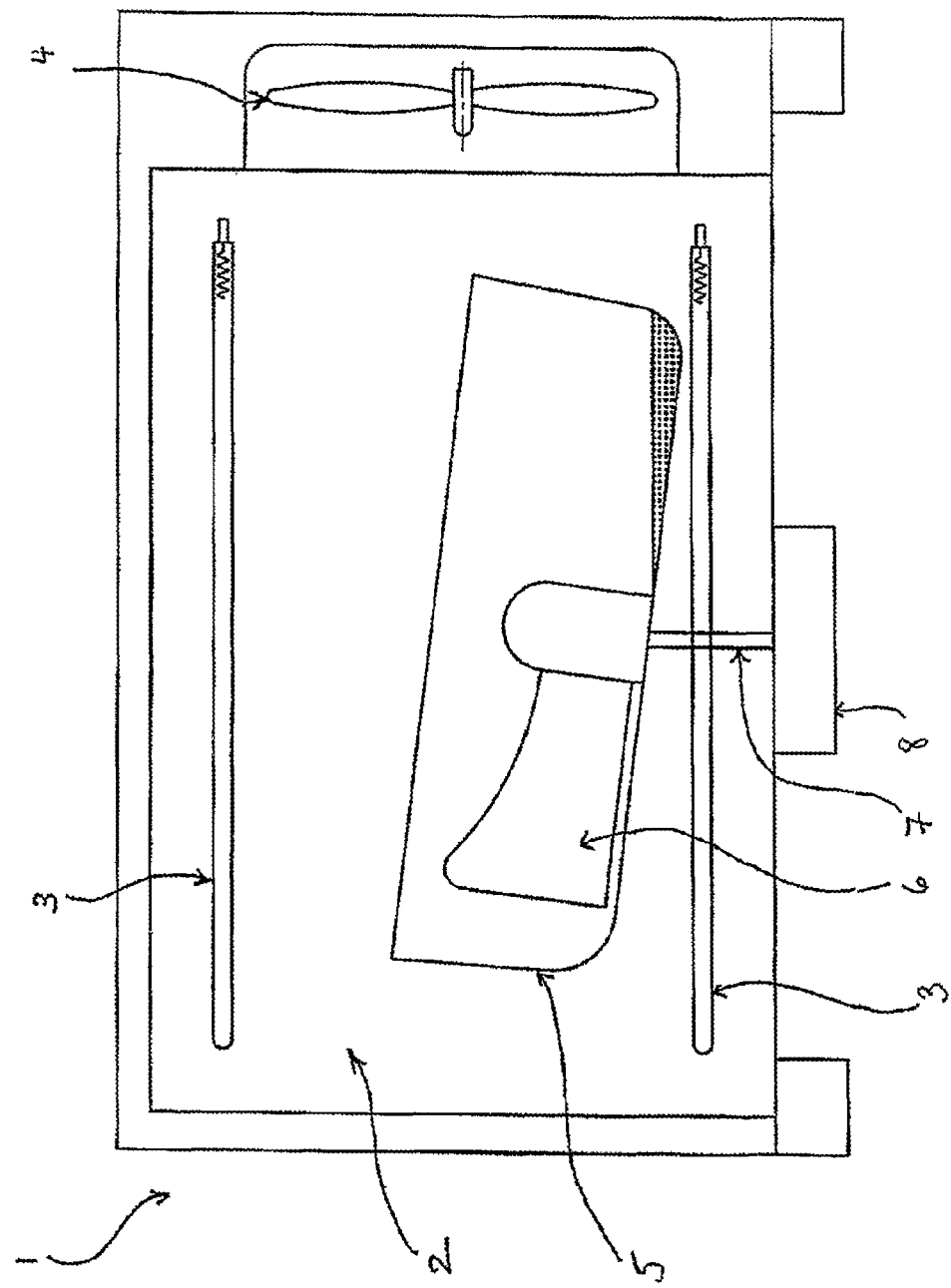
FIG. 7 shows a cross-sectional front view of the oven with a lateral fan in accordance with another embodiment of the invention.

In a further preferred embodiment of the invention, as shown in FIG. 7, the vessel 5 is mountable in the cooking chamber 2 at an angle of inclination relative to the horizontal plane of the support base of the oven, said angle preferably being between 20° and 40°. In this embodiment, the drive pin 7 and the rotational axis of the stirring blade 6 are at a corresponding angle of between 70° and 50°. The vessel 5 is hence inclined such that the fat substance is primarily collected in one portion of the vessel, thereby facilitating cooking by fat substance immersion while requiring only a very low level of fat substance. The action of the stirring blade 6 ensures that the cooking surface of the vessel 5 that is not submerged under the collected fat substance can be provided with a film of fat substance for facilitating cooking by frying. The level of the fat substance is preferably approximately such that the fat substance is able to substantially fill the portion of the vessel 5 that is below the horizontal plane extending through the centre of the bore on the bottom of the vessel.

The invention can be used for cooking any type of food in a very low level of fat substance, preferably potatoes.

The electric oven for cooking a food product in a very low level of fat substance thus conceived is susceptible to numerous modifications and variations, all falling within the scope of the inventive concept; furthermore, all details may be substituted by technically equivalent elements.

In practice, any material type or size may be used, according to needs and the state of the art.

The invention claimed is:

1. An electric oven for cooking a food product in a fat substance comprising:
    a cooking chamber having a top wall and a bottom wall,
    at least one fan housed externally to said cooking chamber and located at said top wall of said cooking chamber for forced circulation of air through said cooking chamber,
    at least two electrical heating resistances housed in said cooking chamber,
    one of said two electrical heating resistances being arranged at said top wall of said cooking chamber and another of said two electrical heating resistances being arranged at said bottom wall of said cooking chamber,
    said forced circulation of air, produced by said at least one fan, circulates past both of said at least two electrical heating resistances,
    a vessel mountable inside said cooking chamber between said two electrical heating resistances and housing at least one rotatable stirring blade that can rotate said food product to cover said food product with a film of fat substance, and a drive pin to drive said stirring blade in rotation,
    said stirring blade being configured so as to displace said food product such that at least a portion of said food product is able to come into contact with said fat substance for combined cooking by action of air on the portion of said food product located above said fat substance and by action of fat substance immersion at least on a portion of said food product immersed in said fat substance,
    wherein said vessel includes a bottom surface and is mountable in said cooking chamber so that said bottom surface is inclined at an angle of inclination relative to a horizontal support base of the electric oven, and
    wherein said angle of inclination of the bottom surface of said vessel is between 20° and 40° relative to a horizontal support base of said electric oven.

2. The electric oven according to claim 1, including an additional electrical heating element in front of said fan.

3. The electric oven according to claim 1, wherein said drive pin is releasably engageable with said stirring blade through a vessel bore provided on a bottom of said vessel.

4. The electric oven according to claim 3, wherein said vessel bore comprises a rim adapted to cooperate with a central bushing of said stirring blade for providing a sealable connection there between.

5. The electric oven according to claim 3, wherein said drive pin protrudes through the bottom wall of said cooking chamber.

6. The electric oven according to claim 1, wherein said vessel is of thermally conductive material.

7. The electric oven according to claim 1, wherein said fat substance is such as to be able to fill the portion of said vessel below a horizontal plane extending through a center of a bottom of said vessel.

8. An electric oven for cooking a food product in a fat substance comprising:
    a cooking chamber,
    at least one fan housed externally to said cooking chamber for forced circulation of air through said cooking chamber,
    at least two electrical heating resistances housed in said cooking chamber,
    a vessel mountable inside said cooking chamber in between said two electrical heating resistances and housing at least one rotatable stirring blade that is able to rotate said food product to cover said food product with a film of fat substance, and
    a drive pin to drive said stirring blade in rotation,
    said vessel including a bottom surface and being mountable in said cooking chamber such that said bottom surface of said vessel is inclined at an angle of inclination between 20° and 40° relative to a horizontal support base of said electric oven,
    said stirring blade being configured so as to displace said food product such that at least a portion of said food product is able to come into contact with said fat substance for combined cooking by action of air on the portion of said food product located above said fat substance and by action of fat substance immersion at least on a portion of said food product immersed in said fat substance.

\* \* \* \* \*